United States Patent
Morvan et al.

(10) Patent No.: US 9,598,629 B2
(45) Date of Patent: Mar. 21, 2017

(54) DESORBANTS FOR ENHANCED OIL RECOVERY

(71) Applicants: RHODIA OPERATIONS, Paris (FR); INSTITUT FRANCAIS DU PETROLE, Rueil-Malmaison (FR)

(72) Inventors: Mikel Morvan, Pessac (FR); Patrick Moreau, Bordeaux (FR); René Tabary, Rueil-Malmaison (FR); Brigitte Bazin, Rueil-Malmaison (FR)

(73) Assignees: RHODIA OPERATIONS, Aubervilliers (FR); INSTITUT FRANCAIS DU PETROLE, Rueil-Malmaison (FR)

( * ) Notice: Subject to any disclaimer, the term of this patent is extended or adjusted under 35 U.S.C. 154(b) by 0 days.

(21) Appl. No.: 14/373,648

(22) PCT Filed: Jan. 25, 2013

(86) PCT No.: PCT/EP2013/051464
§ 371 (c)(1),
(2) Date: Jul. 22, 2014

(87) PCT Pub. No.: WO2013/110774
PCT Pub. Date: Aug. 1, 2013

(65) Prior Publication Data
US 2015/0291875 A1 Oct. 15, 2015

(30) Foreign Application Priority Data

Jan. 25, 2012 (FR) .................................. 12 00216

(51) Int. Cl.
*E21B 43/16* (2006.01)
*E21B 43/22* (2006.01)
*C09K 8/584* (2006.01)

(52) U.S. Cl.
CPC .............. *C09K 8/584* (2013.01); *E21B 43/16* (2013.01)

(58) Field of Classification Search
CPC .... C09K 8/584; C09K 8/588; C09K 2208/30; E21B 43/20; E21B 43/16
See application file for complete search history.

(56) References Cited

U.S. PATENT DOCUMENTS

| | | | |
|---|---|---|---|
| 3,799,264 A * | 3/1974 | Cardenas et al. .............. 166/275 |
| 4,276,933 A * | 7/1981 | Kudchadker et al. ........ 166/266 |
| 4,448,697 A | 5/1984 | McCoy et al. |
| 5,998,102 A | 12/1999 | Eckler |
| 2007/0295640 A1* | 12/2007 | Tan ........................ C09K 8/524 208/22 |
| 2009/0188669 A1* | 7/2009 | Berg ....................... E21B 43/16 166/270.1 |
| 2010/0248321 A1* | 9/2010 | Steaffens .............. E21B 43/006 435/166 |

OTHER PUBLICATIONS

Rhodasurf La-12, Product Detail, URL <http://www.rhodia.com/en/markets_and_products/product_finder/product_details.tcm?productCode=90018992& >, retrieved from the Internet Nov. 10, 2015.

* cited by examiner

*Primary Examiner* — Zakiya W Bates
(74) *Attorney, Agent, or Firm* — Vorys, Sater, Seymour and Pease LLP

(57) ABSTRACT

Provided is a process of enhanced oil recovery from an oil reservoir of an underground formation by using a compound of formula (I) to inhibit the phenomena of retention of anionic surfactants within an oil-bearing reservoir, such as a carbonate or clay reservoir: $R-O-(-CH_2-CH(-CH_3)-O-)_m-(-CH_2-CH_2-O-)_n-H$,
wherein: R is a hydrocarbon-based group comprising from 6 to 40 carbons; m ranges from 0 to 20; n is greater than m and ranges from 5 to 40.

23 Claims, No Drawings

DESORBANTS FOR ENHANCED OIL RECOVERY

CROSS-REFERENCE TO RELATED APPLICATIONS

The present application is a U.S. national stage entry under 35 U.S.C. §371 of International Application No. PCT/EP2013/051464 filed Jan. 25, 2013, which claims priority to FR Application No. 12.00216 filed on Jan. 25, 2012, the whole content of this application being herein incorporated by reference for all purposes.

The present invention relates to the field of the enhanced recovery of crude oil from underground formations, and more particularly to the problems of retention of surfactants in these underground formations during steps of enhanced oil recovery.

During the extraction of oil from a hydrocarbon reservoir (oil-yielding reservoir such as a consolidated or non-consolidated rock formation, or a sand, for example), according to a first step known as "primary recovery", the oil is entrained out of a production well by the excess pressure naturally prevailing in the reservoir. This primary recovery gives access to only a small amount of the oil contained in the reservoir, typically at the very most about 10% to 15%.

In order to enable the extraction of the oil to continue after this primary recovery, secondary production methods are employed, when the pressure in the reservoir becomes insufficient to displace the oil that is still in place. Typically, a fluid is injected (reinjection of the diluted or undiluted water produced, injection of sea or river water, or alternatively injection of gas, for example) into the hydrocarbon reservoir, in order to exert in the reservoir an excess pressure capable of entraining the oil toward the production well(s). A usual technique in this context is injection of water (also known as inundation or waterflooding), in which large volumes of water are injected under pressure into the reservoir via injection wells. The injected water entrains part of the oil that it encounters and pushes it toward one or more production wells. However, secondary production methods such as waterflooding make it possible to extract only a relatively small part of the hydrocarbons in place (typically about 30%). This partial flushing is due especially to the trapping of the oil by the capillary forces, to the differences in viscosity and density existing between the injected fluid and the hydrocarbons in place, and also to heterogeneities at microscopic or macroscopic scales (at the scale of the pores and also at the scale of the reservoir).

To attempt to recover the rest of the oil which remains in the underground formations after the use of the primary and secondary production methods, various techniques have been proposed, which are known as Enhanced Oil Recovery. Among these techniques, mention may be made of techniques similar to the abovementioned waterflooding (inundation), but using a water comprising additives, for instance water-soluble surfactants (this is then typically referred to as surfactant flooding). The use of such surfactants especially induces a decrease in the water/oil interface tension, which is capable of ensuring more efficient entrainment of the oil trapped in the pore constrictions.

The surfactants usually recommended in this context are typically anionic surfactants, especially of sulfate or sulfonate type. Although they do indeed prove to be effective in lowering the water/oil interface tension, these anionic surfactants have a drawback, which is that they tend to remain trapped in the underground formations, typically taking into account chemical absorption phenomena at the surface of the rocks, which appreciably affects the recovery efficacy and/or the process costs.

Among other things, the surfactants thus immobilized in the reservoir can no longer participate in the mobilization and extraction of the oil, and the extraction efficacy is consequently affected. Strong adsorption may be compensated for by the use of high concentrations of surfactants, but with repercussions in terms of costs. More generally, the surfactant adsorption phenomena have a negative impact on the extraction costs.

The adsorption phenomena of the abovementioned anionic surfactants are most particularly pronounced:
- when the surfactants are used in a water with high contents of salt and/or of divalent cations (especially seawater); and
- in certain rock formations, such as carbonates or clay rocks such as argillaceous sandstones (in which the adsorption is high, even if waters with high contents of salt and/or of divalent ions are avoided).

To inhibit the surfactant adsorption phenomena, various solutions have been proposed, which are more or less effective and which are generally limited to specific conditions of use.

Thus, in particular, it has been proposed to use sacrificial agents, which are supposed to have greater affinity for the rock than the surfactant species employed for the enhanced oil recovery. In this context, the possible use of lignosulfonates or of poly(ethylene oxides) of low molecular mass, whose efficacy is variable, especially depending on the nature of the surfactants, of the rock and of the salinity conditions, has been disclosed.

One aim of the present invention is to provide an efficient means for limiting or even overcoming the harmful effects of the retention of anionic surfactants, especially of sulfate and/or sulfonate type, in oil reservoirs during steps of enhanced oil recovery, most particularly in oil-yielding rocks of carbonate or argillaceous rock type.

To this end, the present invention proposes the use of at least one nonionic surfactant chosen from the compounds of formula (I) below:

$$R-O-(-CH_2-CH(-CH_3)-O-)_m-(-CH_2-CH_2-O-)_n-H \quad (I)$$

in which:
- R is a hydrocarbon-based group comprising from 6 to 40, for example from 8 to 20, carbon atoms;
- m is an integer or fraction ranging from 0 to 20, m denoting the number (or, where appropriate, the mean number) of propylene oxide units $-CH_2-CH(-CH_3)-O-$;
- n is an integer or fraction greater than m and between 5 and 40, for example between 6 and 30, n denoting the number (or, where appropriate, the mean number) of ethylene oxide units $-CH_2-CH_2-O-$, for inhibiting the anionic-surfactant retention phenomena in an oil reservoir.

The studies performed by the inventors in the context of the present invention have now made it possible to reveal that the abovementioned compounds of formula (I) are water-soluble agents that have the particularly advantageous property of desorbing anionic surfactants when they are injected in aqueous solution into rocks (oil reservoirs) into which these anionic surfactants have previously been adsorbed. In this sense, the compounds of formula (I) may be termed anionic-surfactant desorbents.

The compounds of formula (I) make it possible in particular to desorb in a particularly efficient manner anionic surfactants of sulfate and/or sulfonate type from oil-yielding rocks, especially mixtures of primary surfactants of olefin sulfonate or alkylarylsulfonate type and secondary surfactants of alkyl ether sulfate or alkyl ether glyceryl sulfonate type.

More generally, the compounds of formula (I) can desorb the majority of the anionic surfactants used for enhanced oil recovery, especially anionic surfactants of carboxylate, phosphate and/or phosphonate type.

For the purposes of the present invention, the notion "anionic surfactant" encompasses all surfactants bearing at least one anionic group under the conditions of the extraction performed. Thus, an anionic surfactant encompasses not only the abovementioned sulfates and sulfonates, but also other types of surfactants, including surfactants of zwitterionic nature. The compounds of formula (I) are particularly suited to the desorption of purely anionic surfactants (namely surfactants bearing not bearing positive charges). This being the case, according to a specific embodiment, the compounds of formula (I) may optionally be used for desorbing compounds of zwitterionic nature (alone or mixed with purely anionic surfactants).

The compounds of formula (I) may moreover inhibit the retention effect of anionic surfactants, especially of the abovementioned type, when they are introduced in combination with said anionic surfactants. In this sense, they may also be considered as anionic-surfactant anti-retention agents in oil-yielding rocks (oil reservoirs). In this context, the compounds of formula (I) may be used in particular for avoiding the retention of anionic surfactants, both when they are used in the form of an extraction liquid and when they are in the form of a foam (obtained by injecting the anionic surfactant and the compound of formula (I) in aqueous medium into the oil-yielding rock followed by injecting a gas, typically according to the "WAG" process). The compounds of formula (I) are especially capable of improving the effect of the foam, by avoiding retention phenomena in the rock.

Moreover, when they are introduced into oil-yielding rocks (oil reservoirs) prior to the injection of anionic surfactants, especially of the abovementioned type, the compounds of formula (I) make it possible to prevent the anionic-surfactant retention effect, by limiting the amount of anionic surfactants that become adsorbed onto the rock. As such, the compounds of formula (I) may also be described as sacrificial agents.

Surprisingly, it furthermore turns out that these various properties are obtained both at low contents of salts and of divalent cations and at a high content of these salts or cations (especially by using seawater as solvent for the surfactants), this also being achieved in rocks of carbonate or argillaceous sandstone type.

Furthermore, the effects observed in the context of the present invention do not involve high concentrations of compound of formula (I). Typically, in the context of the present invention, the compounds of formula (I) are used—alone or in the form of a mixture of several nonionic surfactants of formula (I)—in aqueous fluids comprising these compounds at a concentration that does not need to exceed 5 g/L, and which may be, for example, between 0.1 and 4 g/L, preferably between 0.5 and 2 g/L.

Preferably, the compounds of formula (I) are used in the context of the present invention at least:
- as anionic-surfactant anti-retention agents (they are then introduced at least partly in combination with said anionic surfactants);
- and/or
- as sacrificial agents (they are then introduced at least partly prior to said anionic surfactants).

According to a possible variant, the compounds of formula (I) are used as anionic-surfactant anti-retention agents and then as anionic-surfactant desorbents: they are then introduced, for a first part, in combination with said anionic surfactants, and then, for a second part, subsequent to the introduction of the surfactants, it being understood that said second part may comprise compounds of formula (I) that are identical to or different from those of the first part. The compounds of formula (I) thus afford both a retention-preventing effect and, if need be, a corrective effect. In the context of this variant, to improve the preventive aspect, it is also possible, if need be, to use the compounds of formula (I) as sacrificial agents, namely by injecting them partly prior to the injection of the anionic surfactants.

Besides the abovementioned advantages, the compounds of formula (I) that are useful according to the invention may, at least in certain cases, improve the water solubility of anionic surfactants, especially of sulfate or sulfonate type. The compounds of formula (I) make it possible in this respect to improve the injectivity of certain anionic surfactants, especially mixtures of primary surfactants of olefin sulfonate or alkylarylsulfonate type and secondary surfactants of alkyl ether sulfate or sulfonate type, when they are added in combination with these surfactants.

Furthermore, the use of the compounds of formula (I), which are nonionic surfactants, is of a nature to be able to improve the compatibility of the anionic surfactants, especially of sulfonate type, with other compounds that are used in EOR, for instance viscosity-enhancing polymers such as partially hydrolyzed polyacrylamides, for example, which constitutes yet another advantage of the compounds of formula (I).

According to an advantageous embodiment, the compounds of formula (I) are used in combination with at least one viscosity-enhancing polymer. According to this embodiment, the inhibiting effect on the anionic-surfactant retention or desorption phenomena generally proves to be most particularly advantageous. Usually, an improved effect is observed in the presence of the additional polymer, or even a synergistic effect in certain cases (the inhibiting effect on the retention of the surfactants onto the rock is generally greater than the simple addition of the effect observed in the presence of a compound (I) without polymer and of the effect observed in the presence of the polymer without the compound of formula (I)). Such a synergistic effect is, for example, observed especially for the surfactants or formulations of sulfate or sulfonate type, by using additional polymers that are chosen from polyacrylamides, which are preferably partially hydrolyzed.

The compounds of formula (I) may especially be used in combination with viscosity-enhancing polymers chosen from:
- hydrophilic polymers including homopolymers, copolymers or terpolymers, for instance polymers of modified or unmodified alkyl acrylate type, optionally bearing substituents such as 2-acrylamido-2-methylpropanesulfonic acid, N,N-dimethylacrylamide, vinylpyrrolidone, dimethylaminoethyl methacrylate, acrylic acid, vinyl acetate, vinylsulfonic acid or methacrylic acid groups.
- biopolymers such as guars or xanthan gum, for example.

In the compounds of formula (I), the group —R is a linear or branched, saturated or unsaturated, totally or partially cyclized hydrocarbon-based group. Although the presence of heteroatoms (N, P or halogens) is not excluded, in absolute terms, on this group R, it is usually a group which comprises only hydrogen and carbon atoms. The group —R preferably comprises at least 6 carbon atoms, more preferentially at least 10 carbon atoms. This number of carbon atoms moreover preferably remains less than or equal to 30, preferentially less than or equal to 20.

According to an advantageous embodiment, the group —R is a hydrocarbon-based group of the abovementioned type comprising about 12 carbon atoms. This group —R is linear or branched, and generally non-cyclic, although it may, in certain embodiments, optionally be totally or partially cyclized.

The group —R is preferably a hydrocarbon-based group comprising only hydrogen and carbon atoms, chosen, for example, from alkyls, aryls, arylalkyls and alkylaryls. It may thus typically be a linear or branched alkyl or alkenyl group, then preferably comprising from 6 to 18 carbon atoms, more advantageously from 10 to 16 carbon atoms. As groups R that are particularly suited to the implementation of the invention, mention may be made especially of linear hexyl, heptyl, octyl, nonyl, decyl, undecyl, dodecyl, tridecyl, tetradecyl and pentadecyl alkyl groups, and 2-ethylhexyl groups.

According to a particularly advantageous embodiment, the group —R is a dodecyl group —$(CH_2)_{11}$—$(CH_3)$.

The compounds of formula (I) used in the context of the present invention preferably comprise, as group R, a $C_{10}$ to $C_{18}$ alkyl group, for example a linear $C_{10}$ to $C_{15}$ alkyl group.

Moreover, in the compounds of formula (I), the number n of ethoxylated units preferably ranges from 10 to 24.

Advantageous compounds of formula (I) especially include Rhodasurf® LA 12 sold by the company Rhodia. Alternatively, use may be made of Rhodasurf® LA 9 also available from Rhodia.

Preferably, the abovementioned compounds of formula (I) are used for inhibiting the retention phenomena of anionic surfactants chosen from:
  anionic agents of sulfonate and/or sulfate type;
  mixtures of anionic surfactants comprising one or more anionic agents of sulfonate and/or sulfate type, these mixtures optionally comprising nonionic surfactants.

According to a more specific aspect, a subject of the present invention is processes of enhanced oil recovery from an underground formation, which exploit the abovementioned use of the compounds of formula (I).

Thus, according to a first advantageous embodiment, a subject of the present invention is especially a process of enhanced oil recovery from an underground formation, in which:
  (i) a fluid comprising at least an aqueous medium, an anionic surfactant and optionally an anionic cosurfactant (this fluid typically being free of nonionic surfactant) is injected into said underground formation, via at least one injection well; and then
  (ii) a fluid comprising a compound of formula (I) of the abovementioned type is subsequently injected via the same injection well(s); and
  (iii) said fluid conveying the oil leaving the underground formation is recovered by at least one production means.

According to a preferred variant of this first embodiment, the fluid comprising the anionic surfactant that is used in step (i) may advantageously comprise a compound of formula (I) that is identical to or different from that used in the fluid of step (ii). The compounds of formula (I) are then used both as anti-retention agents and as desorbents.

According to another variant of the first embodiment, which may, if need be, be combined with that of the preceding paragraph, a fluid comprising a compound of formula (I) may be injected prior to step (i), whereby the compounds of formula (I) are used both as sacrificial agents and as anti-retention agents for the anionic surfactants.

According to another advantageous embodiment, a subject of the present invention is a process of enhanced oil recovery from an underground formation, in which:
  a fluid comprising at least an aqueous medium, an anionic surfactant and optionally an anionic cosurfactant (this fluid typically being free of nonionic surfactant) and a compound of formula (I) of the abovementioned type is injected into said underground formation, via at least one injection well; and then
  said fluid conveying the oil leaving the underground formation is recovered by at least one production means.

The compound of formula (I) is then used as an anionic-surfactant anti-retention agent. In this case also, according to a possible variant, fluid comprising the anionic surfactants and the anti-retention agent may optionally be injected prior and/or subsequent to the injection, whereby the compounds of formula (I) will also partly serve, respectively, as sacrificial agents and/or desorbents for the anionic surfactants.

According to yet another advantageous embodiment, a subject of the present invention is a process of enhanced oil recovery from an underground formation, in which:
  (i) a fluid comprising a compound of formula (I) of the abovementioned type is injected into said underground formation, via at least one injection well; and then
  (ii) a fluid comprising at least an aqueous medium, an anionic surfactant and optionally an anionic cosurfactant (this fluid typically being free of nonionic surfactant) is introduced; and then
  (iii) said fluid conveying the oil leaving the underground formation is recovered by at least one production means.

The compound of formula (I) is then used as a sacrificial agent. According to an advantageous variant of this embodiment, the fluid used in step (ii) may comprise a compound of formula (I) that is identical to or different from that used in step (i), whereby the compounds of formula (I) act both as sacrificial agents and as anti-retention agents for the anionic surfactants. Alternatively or in addition, a fluid comprising a compound of formula (I), which is identical to or different from that used in step (i) and, where appropriate, step (ii), may be introduced, whereby the compounds of formula (I) also serve as anionic-surfactant desorbents.

The different variants of the processes of the invention may be advantageously used for the enhanced recovery of oil in underground formations which are consolidated or non-consolidated, carbonate-based or argillaceous (especially argillaceous sandstone) rocks. Be that as it may, the invention shall not be limited solely to such reservoirs.

The examples below illustrate a nonlimiting embodiment of the invention and advantages relating to the compounds of formula (I).

EXAMPLE 1

Static Adsorption

This example illustrates the effect of the compounds of formula (I) on the adsorption of an anionic surfactant formulation (mixture of sodium olefin sulfonate and of alkyl ether sulfate) on different types of rocks.

The anionic surfactant formulation used in this example was prepared in a brine of high hardness, i.e. containing 35

000 ppm of dissolved salts including 3000 ppm of divalent cations (calcium and magnesium).

The adsorption was measured via a standard method on different types of milled rock (sandstone from Clashach, limestone from Lavoux, Dolomite), in reference to the specific surface area of the rock, determined by the BET method with krypton, by introducing the milled rock into the brine with a rock/brine mass ratio solid concentration is 20% by weight (2 g of rock in 10 g of brine) with a concentration of anionic surfactant in the brine of 2 g/L.

The adsorption of the formulation was first measured in the absence of any additive (reference) and then by adding various agents to the formulation.

The results obtained are reported in Table 1 below, in which the adsorption is expressed in mg of anionic surfactants per square meter of rock surface.

TABLE 1

| Agent added to the brine | adsorption (mg/m$^2$) | | |
|---|---|---|---|
| | Clashach | Lavoux | Dolomite |
| None (control) | 3.5 | 6.2 | 5.3 |
| Rhodasurf ® LA12 - 2 g/L | 1.9 | 3.8 | 4 |
| Compound of formula I in which m = 0, n = 21 and R = C$_{10-12}$ alkyl | 1.1 | 3.2 | 3.9 |

EXAMPLE 2

Use of a Compound of Formula (I) for an Enhanced Recovery of Hydrocarbon

In this example, Rhodasurf® LA12 was used as desorbent in an experiment reproducing the conditions of an enhanced oil recovery (tertiary recovery experiment), using the same brine as in Example 1.

To do this, a sample of rock (core sample of sandstone from Clashach) was placed under conditions representing a mature oil reservoir (condition referred to as residual oil saturation) according to a known methodology.

An enhanced recovery (tertiary) was then performed under the following conditions:
(i) injection of a solution of a surfactant (mixture of sodium olefin sulfonate and of alkyl ether sulfate—8 g/L) and of a polymer (Flopaan 3330S sold by SNF—2 g/L), with a total injection of 0.5 volume of pore (0.5 PV) of this formulation; and then
(ii) injection of 1.5 PV of solution comprising the polymer (2 g/L) and 2 g/L of Rhodasurf® LA12;
(iii) injection of 2 PV of brine.

For comparative purposes, the same experiment was repeated, the only difference being that the solution of step (ii) contained only the polymer (without Rhodasurf® LA12).

The amounts of oil extracted in each of the two experiments (with and without use of Rhodasurf® LA12) are reported in the table below.

The amount of oil extracted is expressed as a percentage of the residual oil after flushing with water (% ROIP).

Table 2 below also reports the adsorption of the surfactant, determined by the difference between the amount injected and the amount recovered on leaving the rock. It is expressed in mg of anionic surfactants per gram of rock.

TABLE 2

| Experiment | adsorption (mg/g) | % ROIP |
|---|---|---|
| without Rhodasurf® LA12 | 0.51 | 33% |
| with Rhodasurf® LA12 | 0.2 | 87% |

EXAMPLE 3

Use of a Compound of Formula (I) for an Enhanced Recovery of Hydrocarbon

In this example, Rhodasurf® LA12 was used in an experiment reproducing the conditions of an enhanced oil recovery (tertiary recovery experiment), using the same brine as in Example 2.

To do this, as in the preceding example, a sample of rock (core sample) was placed under conditions representing a mature oil reservoir (condition referred to as residual oil saturation) according to a known methodology. Contrary to the preceding experiment, the oil used in this example is a reservoir oil (petroleum).

An enhanced recovery (tertiary) was then performed under the following conditions:
(i) injection of a solution of a surfactant (mixture of sodium olefin sulfonate and of alkyl ether sulfate—8 g/L) and of a polymer (Flopaan 3330S sold by SNF—2 g/L), and also 0.3 g/L of Rhodasurf LA12. A total injection of 0.5 volume of pore (0.5 PV) of this formulation; and then
(ii) injection of 1.5 PV of solution comprising the polymer (2 g/L) and 2 g/L of Rhodasurf LA12;
(iii) injection of 2 PV of brine.

For comparative purposes, the same experiment was repeated, the only difference being that the solutions of step (i) and of step (ii) did not contain any Rhodasurf LA12 (see Example 2).

The amounts of oil extracted in each of the two experiments (with and without use of Rhodasurf LA12) are reported in the table below.

The amount of oil extracted is expressed as a percentage of the residual oil after flushing with water (% ROIP).

Table 3 below also reports the adsorption of the surfactant, determined by the difference between the amount injected and the amount recovered on leaving the rock. It is expressed in mg of anionic surfactants per gram of rock.

TABLE 3

| Experiment | Adsorption (mg/g) | % ROIP |
|---|---|---|
| without Rhodasurf LA12 | 0.55 | 20.8% |
| with Rhodasurf LA12 | 0.23 | 53% |

EXAMPLE 4

Use of a Compound of Formula (I) for an Enhanced Recovery of Hydrocarbon

In this example, Rhodasurf® LA12 was used as desorbent in an experiment reproducing the conditions of an enhanced oil recovery (tertiary recovery experiment), for carbonate-based reservoirs, for which the adsorption of the anionic surfactants is particularly high. Lavoux limestone is used as representative rock. The brine is a sodium chloride solution (72 g/L).

To do this, a sample of rock (core sample) was placed under conditions representing a mature oil reservoir (condition referred to as residual oil saturation) according to a known methodology.

An enhanced recovery (tertiary) was then performed under the following conditions:
(i) injection of a solution of a surfactant (mixture of sodium olefin sulfonate and of alkyl ether sulfate—8 g/L) and of a polymer (Flopaan 3330S sold by SNF—2 g/L), and also 1 g/L of Rhodasurf LA12. A total injection of 0.8 volume of pore (0.5 PV) of this formulation; and then
(ii) injection of 1.5 PV of solution comprising the polymer (2 g/L) and 2 g/L of Rhodasurf LA12;
(iii) injection of 2 PV of brine.

For comparative purposes, the same experiment was repeated, the only difference being that the solution of step (i) did not contain any Rhodasurf LA12.

The amounts of oil extracted in each of the two experiments (with and without use of Rhodasurf LA12) are reported in the table below.

The amount of oil extracted is expressed as a percentage of the residual oil after flushing with water (% ROIP).

Table 4 below also reports the adsorption of the surfactant, determined by the difference between the amount injected and the amount recovered on leaving the rock. It is expressed in mg of anionic surfactants per gram of rock.

TABLE 4

| Experiment | adsorption (mg/g) | % ROIP |
| --- | --- | --- |
| without Rhodasurf LA12 | 0.57 | 16% |
| with Rhodasurf LA12 | 0.42 | 38.4% |

The invention claimed is:

1. A process of enhanced oil recovery by surfactant flooding from an oil reservoir of an underground formation comprising the steps of:
   introducing into the oil reservoir a fluid comprising at least an aqueous medium and at least one water-soluble anionic surfactant,
   introducing into the oil reservoir at least one nonionic surfactant, being injected in aqueous solution, selected from the compounds of formula (I) below:

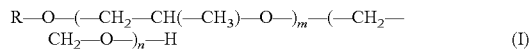

in which:
   R is a dodecyl group —$(CH_2)_{11}$—$(CH_3)$;
   m is a number ranging from 0 to 20;
   n is a number greater than m and between 5 and 40;
   for inhibiting the anionic-surfactant retention phenomena in the oil reservoir,
   in which, the nonionic surfactant compound of formula (I) is introduced by at least one of the steps selected from the group consisting of:
      introduced at least partly in combination with said anionic surfactant as an anti-retention agent for said anionic surfactants;
      introduced as a sacrificial agent at least partly prior to said anionic surfactant to prevent the anionic surfactant retention effect; and
      introduced subsequently to said anionic surfactant as an anti-retention agent for said anionic surfactants;
   after said introducing of the anionic and nonionic surfactants fluid conveying the oil and the anionic surfactant leaves the underground formation.

2. The process as claimed in claim 1, in which the nonionic surfactant of formula (I) is used for desorbing anionic surfactants trapped beforehand in the reservoir, the nonionic surfactant of formula (I) being injected in aqueous solution into the oil reservoir into which these anionic surfactants have been adsorbed beforehand.

3. The process as claimed in claim 2, in which the anionic surfactant is
   at least one anionic agent selected from the group consisting of sulfonate type anionic agents, sulfate type anionic agents, and mixtures thereof.

4. The process as claimed in claim 2, in which the anionic surfactants are surfactants of carboxylate, phosphate and/or phosphonate type, or surfactants of zwitterionic nature.

5. The process as claimed in claim 2, in which the anionic surfactant is selected from:
   at least one anionic agent of sulfate type;
   mixtures of anionic surfactants comprising both one or more anionic agents of sulfonate type and one or more anionic agents of sulfate type.

6. The process as claimed in claim 1, in which the nonionic surfactant of formula (I) is introduced in combination with said anionic surfactants, and is used as an anionic-surfactant anti-retention agent in the oil reservoir.

7. The process as claimed in claim 1, in which the nonionic surfactant of formula (I) is introduced into the reservoir prior to the injection of anionic surfactants, as a sacrificial agent, for preventing the anionic-surfactant retention effect, by limiting the amount of anionic surfactants that become adsorbed.

8. The process as claimed in claim 1, in which the nonionic surfactant of formula (I) or the mixture of nonionic surfactants of formula (I) being injected in aqueous solution is at a concentration of less than 5 g/L.

9. The process as claimed in claim 8, wherein said concentration is between 0.1 and 4 g/L.

10. The process as claimed in claim 9, wherein said concentration is between 0.5 and 2 g/L.

11. The process as claimed in claim 1, in which the nonionic surfactant of formula (I) is used in combination with at least one viscosity-enhancing polymer.

12. The process as claimed in claim 11, wherein the viscosity enhancing polymer is selected from the group consisting of hydrophilic polymers including homopolymers, copolymers or terpolymers, polymers of modified or unmodified alkyl acrylate type, optionally bearing substituents, 2-acrylamido-2-methylpropanesulfonic acid, N,N-dimethylacrylamide, vinylpyrrolidone, dimethylaminoethyl methacrylate, acrylic acid, vinyl acetate, vinylsulfonic acid or methacrylic acid groups; biopolymers, guars or xanthan gum is introduced into the oil reservoir.

13. The process as claimed in claim 11, wherein said viscosity-enhancing polymer is a partially hydrolyzed polyacrylamide.

14. The process as claimed in claim 1, wherein the nonionic surfactant compound of formula (I) is introduced as a sacrificial agent at least partly prior to said anionic surfactant to prevent the anionic surfactant retention.

15. The process as claimed in claim 1, in which the number n of ethoxylated units in the nonionic surfactant of formula (I) ranges from 10 to 24.

16. The process of enhanced oil recovery from an underground formation as claimed in claim 1, in which:
   a fluid comprising at least an aqueous medium and the anionic surfactant, and a compound of formula (I) is injected into said underground formation, via at least one injection well; and then said fluid conveying the oil leaving the underground formation is recovered by at least one production means.

17. The process as claimed in claim 1, in which:
a fluid comprising a compound of formula (I) is injected into said oil reservoir of said underground formation, via at least one injection well; and then
a fluid comprising at least an aqueous medium and the anionic surfactant is introduced; and then
said fluid conveying the oil leaving the underground formation is recovered by at least one production means.

18. The process as claimed in claim 1, in which the underground formation is a carbonate-based rock.

19. The process as claimed in claim 1, wherein said group —R present on the nonionic surfactant of formula (I) is a linear or branched alkyl or alkenyl group comprising from 6-18 carbon atoms.

20. The process as claimed in claim 1, wherein the oil reservoir is an argillaceous reservoir.

21. A process of enhanced oil recovery of claim 1 wherein;
a fluid comprising at least one aqueous medium, the anionic surfactant and optionally an anionic cosurfactant is injected into the underground formation, via at least one injection well; and then
a fluid comprising the compound of formula (I) is subsequently injected via the same at least one injection well; and
the fluid conveying the oil leaving the underground formation is recovered by at least one production means.

22. The process as claimed in claim 1, comprising the steps of:
introducing into the oil reservoir a fluid consisting of at least one aqueous medium and at least one anionic surfactant, and
introducing into the oil reservoir a fluid consisting of at least one nonionic surfactant and at least one aqueous medium selected from the compounds of formula (I).

23. A process of enhanced oil recovery by surfactant flooding from a carbonate-based or argillaceous oil reservoir of an underground formation comprising the steps of:
introducing into the oil reservoir at least one water-soluble anionic surfactant,
introducing into the oil reservoir at least one nonionic surfactant, being injected in aqueous solution, selected from the compounds of formula (I) below:

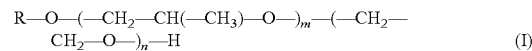

(I)

in which:
R is a dodecyl group —$(CH_2)_{11}$—$(CH_3)$;
m is a number ranging from 0 to 20;
n is a number greater than m and between 6 and 30;
for inhibiting the anionic-surfactant retention phenomena in the oil reservoir,
in which, the compound of formula (I) is introduced by at least one of the steps selected from the group consisting of:
introduced at least partly in combination with said anionic surfactant as an anti-retention agent for said anionic surfactants;
introduced as a sacrificial agent at least partly prior to said anionic surfactant to prevent the anionic surfactant retention effect; and
introduced subsequently to said anionic surfactant as an anti-retention agent for said anionic surfactants;
wherein treatment of the oil reservoir with surfactants for the enhanced oil recovery consists of:
the introducing into the oil reservoir the anionic surfactants by injecting a fluid of the aqueous medium and the anionic surfactant and optionally salts into the oil reservoir of the underground formation, via at least one injection well; and then
the introducing into the oil reservoir the at least one nonionic surfactant selected from the compounds of formula (I) in aqueous solution by injecting a fluid of an aqueous medium and the compound of formula (I) and optionally salts subsequently via the same injection well(s);
introducing into the oil reservoir a viscosity enhancing polymer selected from the group consisting of hydrophilic polymers including homopolymers, copolymers or terpolymers, polymers of modified or unmodified alkyl acrylate type, optionally bearing substituents, 2-acrylamido-2-methylpropanesulfonic acid, N,N-dimethylacrylamide, vinylpyrrolidone, dimethylaminoethyl methacrylate, acrylic acid, vinyl acetate, vinylsulfonic acid or methacrylic acid groups; biopolymers, guars or xanthan gum; and
after the surfactant treatment the fluid conveying the oil and the anionic surfactant leaves the underground formation.

* * * * *